May 20, 1941.    G. STEIN    2,242,485
PRODUCTION OF ALKYLENE OXIDES DIFFICULTLY SOLUBLE IN WATER
Filed Dec. 30, 1938
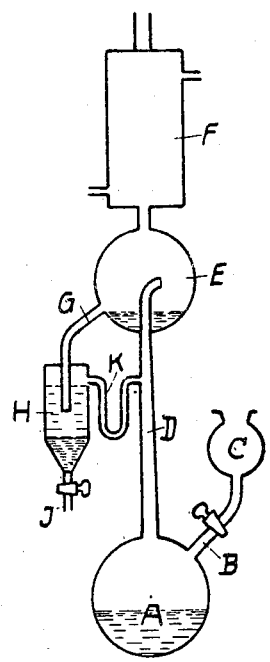
Gerhard Stein
INVENTOR.
BY
HIS ATTORNEYS Patented May 20, 1941

2,242,485

UNITED STATES PATENT OFFICE 2,242,485

PRODUCTION OF ALKYLENE OXIDES DIFFICULTLY SOLUBLE IN WATER

Gerhard Stein, Mannheim, Germany, assignor, by mesne assignments, to General Aniline & Film Corporation, New York, N. Y., a corporation of Delaware Application December 30, 1938, Serial No. 248,420
In Germany December 31, 1937

2 Claims. (Cl. 260—348)

My present invention relates to improvements in and apparatus for the production of alkylene oxides difficultly soluble in water.

In the production of alkylene oxides by treating alkylene chlorhydrins with alkali metal hydroxides, alkali metal carbonates or alkaline earth metal hydroxides the alkylene oxides formed, especially those containing ester or ether groups, are liable to further react with the alkali thus forming saponification products. In order to avoid this it has already been proposed to use the alkalies in a lower concentration not appreciably exceeding $\frac{1}{5}$ normal or to allow alkali carbonates or alkaline earth hydroxides to act at from 40° to 120° C. and to remove the alkylene oxide immediately after its formation by distillation from the reaction mass. Both methods lead, however, to satisfactory yields of alkylene oxides only when using high concentrations of alkylene chlorhydrin.

I have now found that alkylene oxides difficultly soluble in water can be obtained in excellent yields from aqueous alkylene chlorhydrin mixtures (which expression comprises solutions of chlorhydrin in water and mixtures of so much chlorhydrin with water that the former is not completely dissolved in the water) by distilling the same with an addition of basic substances, in particular hydroxides or carbonates of the alkali or alkaline earth metals with such a speed that besides the alkylene oxide formed, water and alkylene chlorhydrin are contained in the distilling vapors, separating from the condensate the layer insoluble in water which mainly consists of alkylene oxide, and recycling the aqueous part of the condensate containing alkylene chlorhydrin to the same reaction mixture from which the condensate has been obtained or to another reaction mixture of the same kind. In this way even 1 to 10 per cent mixtures of alkylene chlorhydrin and water can be used. A considerable advantage of my invention consists in that less active but more inexpensive alkaline substances as for example alkali metal carbonates or earth alkali metal oxides or hydroxides may be used, because according to my process the unconverted chlorhydrins are always returned to the reaction mixture.

Among chlorhydrins suitable according to this invention there may be mentioned for example the gamma-nitric acid ester of alpha-chlor-beta-gamma-dihydroxy-propane, which is converted into glycide nitrate, and also alpha-chlor-beta-hydroxy-gamma-isoamylhydroxypropane and alpha - chlor - beta - hydroxy - gamma - phenoxy - propane, which are converted into the corresponding glycide ethers. The carrying out of the process in practice is preferable in the manner described in detail in the annexed drawing.

By taking care that only small amounts of unconsumed basic substances are present at any time further conversion of already formed alkylene oxide is avoided with certainty. The whole of the basic substance may, however, be added at the beginning. It is advantageous to distill at such a rapid rate that the alkylene oxide formed is distilled off from the liquid reaction mixture immediately after its formation and thereby withdrawn from the influence of boiling water and the basic substances. In carrying out the process in practice, the alkaline substance is preferably added at about the rate at which it is consumed and the mixture of water and alkylene chlorhydrin is subjected to a distillation in a cycle with separation of the alkylene oxide formed while any alkylene chlorhydrin still unconverted and contained in the distilling vapors passes in the cycle back into the reaction chamber and may then be converted into alkylene oxide. The process may be carried out at atmospheric or reduced pressure, but it is also possible to work under increased pressure.

An apparatus suitable for carrying out the process is shown diagrammatically in the accompanying drawing, but the invention is not restricted to the particular apparatus shown.

In the drawing, A is the distillation vessel into which there is introduced through the pipe B from the container C a mixture of an alkylene chlorhydrin and water and the basic substance. In the vessel A the reaction mixture is heated to boiling. The vapors rise through the tube or column D into the vessel E and then into the cooler F where they are condensed. The condensed portion flows through E and the pipe G into the separator H in which a separation into two layers takes place. The lower layer consisting of the alkylene oxide may be withdrawn through J while the upper aqueous layer of the alkylene chlorhydrin solution flows through the overflow K and the column D back into the distillation vessel A. The lower end of the pipe G is lower than the entrance to the overflow pipe K so that the condensed portion flows into the liquid present in H without the condensed alkylene oxide passing into the overflow pipe K. The liquid withdrawn at J is the alkylene oxide with only a small amount of the alkylene chlorhydrin.

The following example will further illustrate how the said invention may be carried out in practice but the invention is not restricted to this example.

Example

Commercial calcium hydroxide is added in an excess of 5 per cent above the calculated amount to a 50 per cent suspension of the gamma-nitric acid ester of alpha-chlor-beta-gamma-dihydroxypropane and the whole is distilled for an hour under a pressure of 80 millimetres (mercury gauge) in the apparatus described in the said specification. When the reaction is completed, the glycide nitrate formed has separated as an insoluble compound in a yield of more than 90 per cent of the calculated amount. Almost the same yield is obtained by starting from a 6 per cent solution.

Instead of the pure nitric ester of alpha-chlor-beta-gamma-dihydroxypropane there may also be used the crude reaction product obtained by causing an excess of nitric acid having a specific gravity of from about 1.1 to 1.55 to react in the cold on epichlorhydrin and neutralizing the unchanged nitric acid.

What I claim is:

1. The process for the production of glycide nitrate which comprises distilling a mixture of water and of the gamma-nitric acid ester of alpha-chlor-beta-gamma-dihydroxypropane with the addition of a basic substance at such a speed that besides the glycide nitrate formed, water and the said nitric acid ester are contained in the distilling vapors, condensing the latter, separating from the condensate the layer insoluble in water which mainly consists of glycide nitrate, and recycling the aqueous part of the condensate containing the said nitric acid ester to the distilling mixture.

2. The process for the production of glycide nitrate which comprises distilling a mixture of water and the reaction product, obtained by causing nitric acid to react with epichlorhydrin, with the addition of a basic substance at such a speed that besides the glycide nitrate formed, water and the said reaction product are contained in the distilling vapors, condensing the latter, separating from the condensate the layer insoluble in water and recycling the aqueous part of the condensate to the distilling mixture.

GERHARD STEIN.